Aug. 4, 1970   D. E. WOOD   3,522,545
DETECTION OF WEAK SIGNALS FROM AMID NOISE
Filed May 5, 1967   3 Sheets-Sheet 1
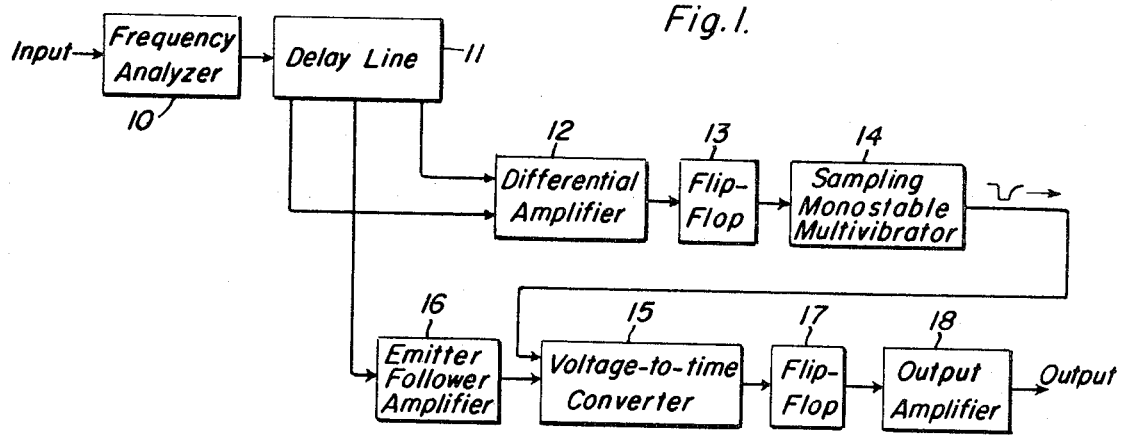
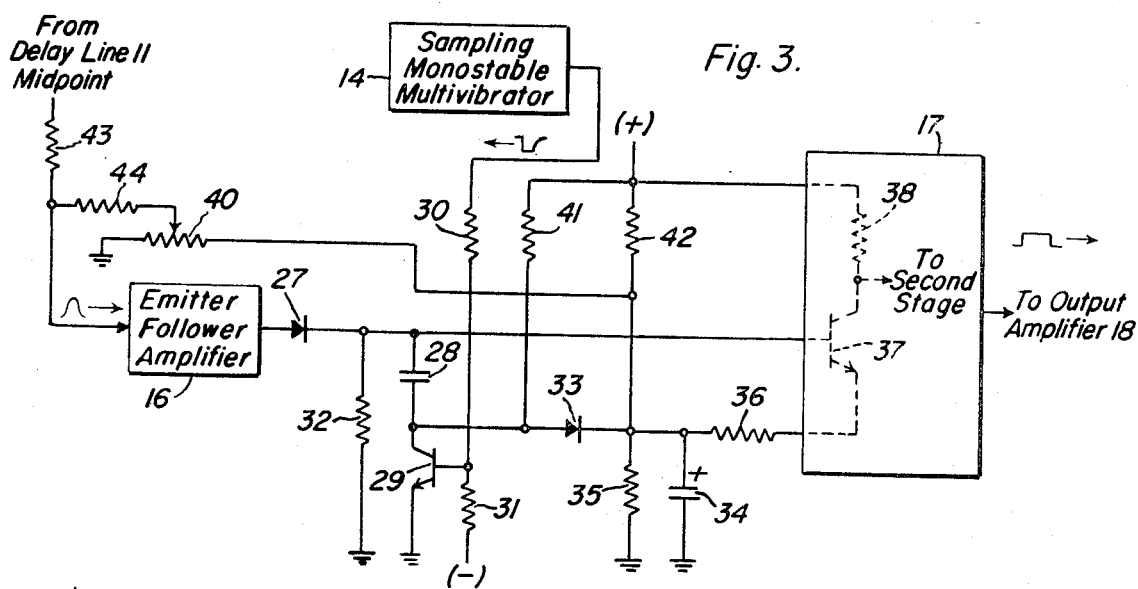
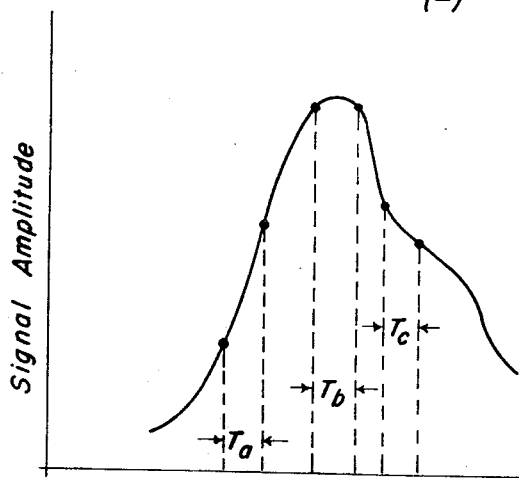
Inventor:
David E. Wood,
by Marvin Snyder
His Attorney.

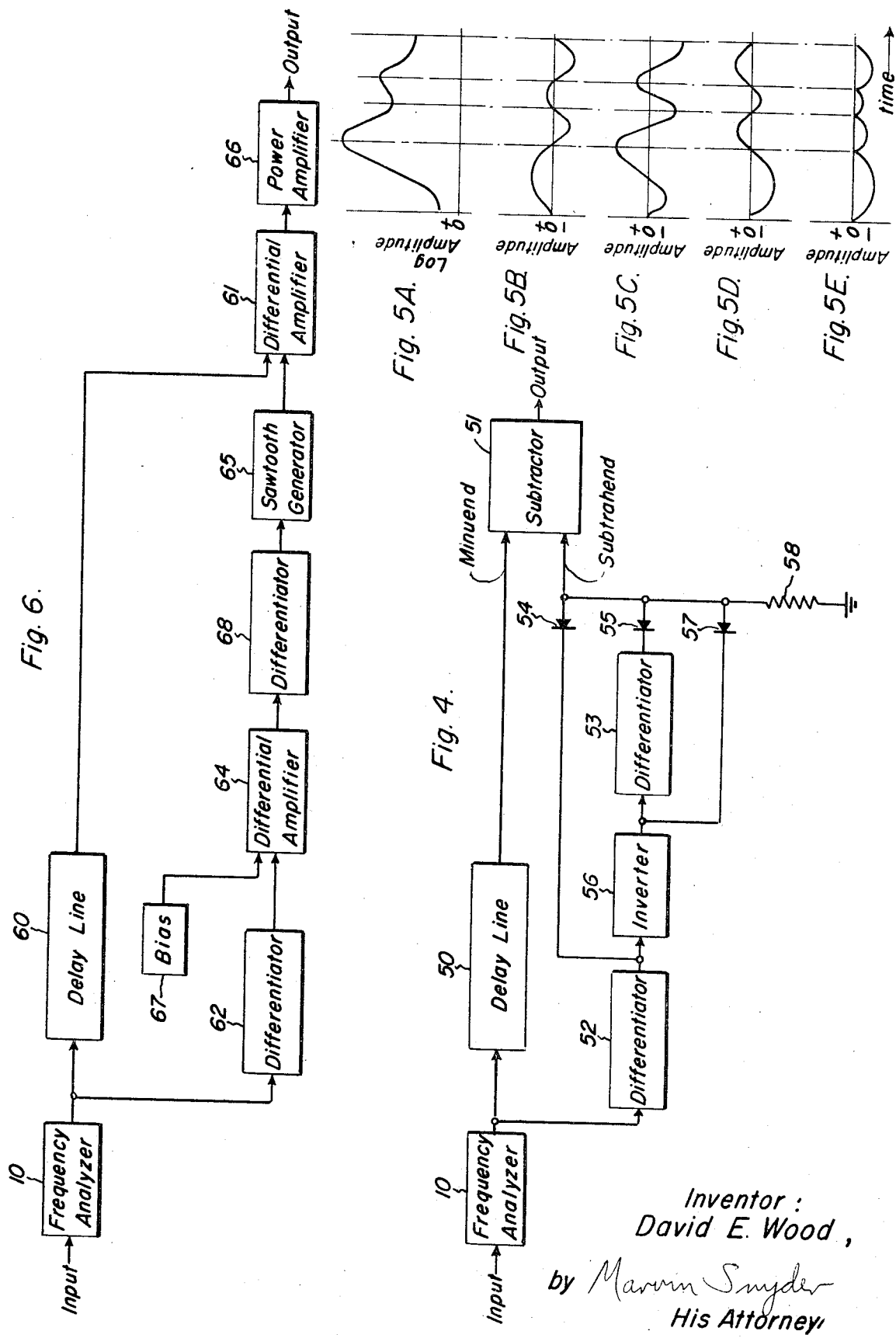

Aug. 4, 1970   D. E. WOOD   3,522,545
DETECTION OF WEAK SIGNALS FROM AMID NOISE
Filed May 5, 1967   3 Sheets-Sheet 3
Fig. 7A.
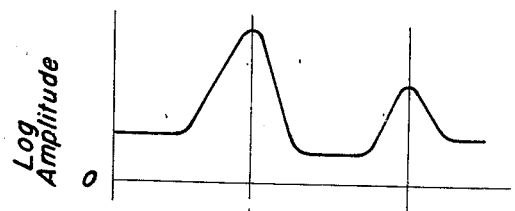
Fig. 7B.
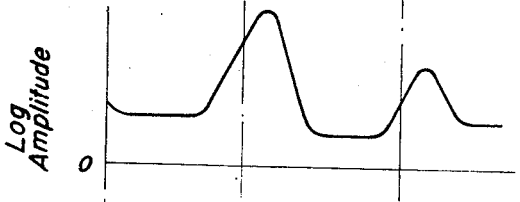
Fig. 7C.
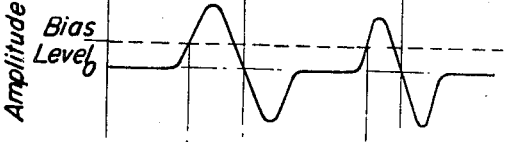
Fig. 7D.
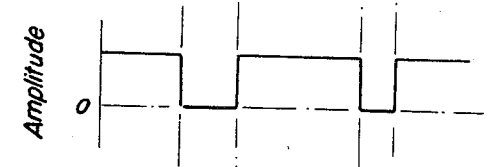
Fig. 7E.
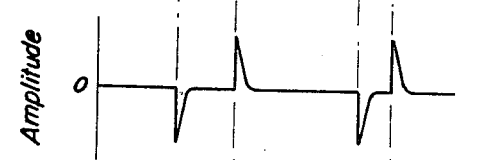
Fig. 7F.
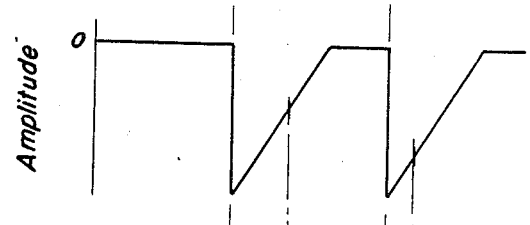
Fig. 7G.
time →
Fig. 8.
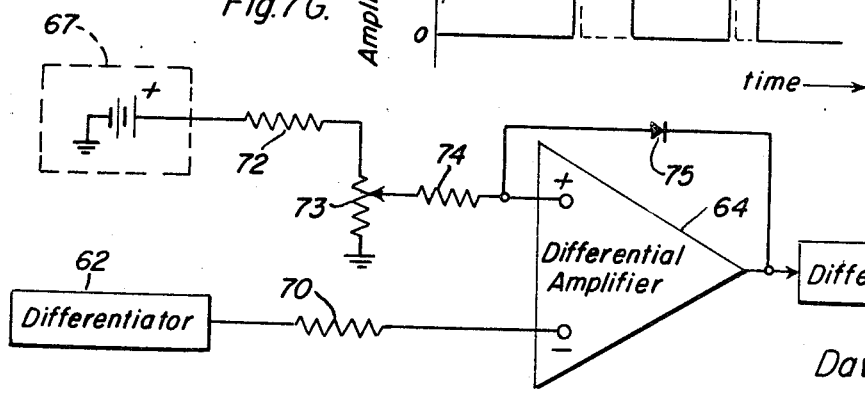
Inventor:
David E. Wood,
by Marvin Snyder
His Attorney.

United States Patent Office 3,522,545
Patented Aug. 4, 1970

3,522,545
DETECTION OF WEAK SIGNALS FROM
AMID NOISE
David E. Wood, Schenectady, N.Y., assignor to General
Electric Company, a corporation of New York
Filed May 5, 1967, Ser. No. 636,324
Int. Cl. H03k 9/02
U.S. Cl. 328—165          8 Claims

ABSTRACT OF THE DISCLOSURE

Extraction of information regarding a small signal obscured by large amounts of random noise is achieved by detecting peaks in the combined noise plus signal spectra. At the instant the zero slope of each peak is detected, a constant amplitude pulse is generated of duration dependent upon the amplitude at which the corresponding zero slope has been detected. Alternatively, the peaks are accentuated by suppressing the entire spectrum signal except the peaks. Three-dimensional mapping of the peaks in terms of frequency, amplitude and time, as thereby permitted, enhances both the quality and quantity of extracted information.

BACKGROUND OF THE INVENTION

This invention relates to signal detection, and more particularly to a method and apparatus for detecting relatively weak signals from amid a background of large amplitude noise.

The problem of small signal detection from amid a background of large amplitude noise is very crucial in systems such as passive and active sonars, amplitude modulated radio frequency receiving systems, jet engine analyzers which detect malfunctions by analysis of engine sounds, and rocket fuel pump malfunction detectors which operate by analyzing vibration and pressure signals. The conventional approach to detection of persistent single frequency sine wave components in noise combines frequency analysis with time averaging of the frequency spectra. The frequency analysis separates signals into individual frequency components while the time averaging further reduces the interfering effect of noise fluctuations beyond the improvement afforded by the resolution into frequencies. Detection of a persistent signal component is then accomplished by sensing the increase in average amplitude of noise plus signal at the desired signal frequency over the lower average amplitude of noise alone at other frequencies.

If the average value of noise were constant and precisely known, this method of conventional detection by sensing relative amplitudes might be completely satisfactory. However, in practical situations, such as with use of passive sonar, background noise is not constant either with frequency or time. Hence, additional circuitry is required in order to normalize noise relations. Not only does this additional circuitry complicate the detection apparatus, but also imperfect functioning of such circuitry results in loss of detection sensitivity as measured by the ratio of probability of detection to false alarm rates. Thus, the greatest weakness in the conventional detection method is the necessity of establishing correct amplitude threshold relations on which decisions as to the presence or absence of a signal component may be based. This weakness is eliminated by the detection approach set forth in the instant invention.

The principle upon which the instant invention operates may be summarized in the following manner. Peaks in random noise spectra are, on the average, equally likely to occur at any frequency. If a relatively weak sine wave is added to noise, a frequency spectrum analysis of the combined signal would show a peak at the frequency of the sine wave, with slopes in regions to either side of that frequency. Thus, it can be reasoned that adding the sine wave to noise increases the probability of peaks occurring over a period of time at the sine wave frequency, while in a frequency region to either side of the sine wave the probability of peaks is reduced. Therefore, the expected number of peaks for a mixture of sine wave plus noise has a distribution different from that of noise alone; that is, as a sine wave component added to noise is increased in relative amplitude, the frequency spectrum in the vicinity of the sine wave frequency approaches the shape of the spectrum of a sine wave alone. Thus, on the average, there are more peaks where a sine wave exists in the noise and fewer peaks in a limited region on either side of the sine wave. By noting only peaks, and always with pulses of the same amplitude, a weak sine wave which may be obscured by the noise may be reliably detected.

By use of the instant invention, precise three-dimensional mapping of detected information may be accomplished. Use of a frequency analyzer provides amplitude, frequency and time data regarding each spectrum generated by the analyzer. However, the spectrum itself still contains combined noise and signal at the ouput of the analyzer. By employing additional apparatus, as described herein, amplitude, frequency and time data regarding each peak of each spectrum may be obtained; that is, amplitude of the peak, frequency at which the peak occurs, and the instant in time at which the peak occurs. These parameters enable detailed three-dimensional mapping of detected information with a high degree of precision.

SUMMARY OF THE INVENTION

One object of this invention is to provide a method and apparatus for detecting, with a high degree of sensitivity, a small signal obscured by large amounts of random noise.

Another object is to provide a simple method and apparatus for reliable detection of desired signal peaks from amid a background of random noise.

Another object is to provide a plurality of constant amplitude pulses whose frequency and duration correspond to the frequency and peak amplitudes of a signal to be detected from amid a background of random noise.

Briefly, in accordance with a preferred embodiment of the invention, a method of detecting a unique frequency signal obscured by a noise background is described. This method comprises the steps of repetitively separating the composite of the noise plus unique frequency signal into sinusoidal frequency spectra, and sensing peaks in each spectrum of the composite of the signal to be sensed and the noise background. In addition, generation of a constant amplitude pulse may ibe initiated at the instant each peak is detected and terminated at a time dependent upon amplitude of this peak.

In accordance with another preferred embodiment of the invention, apparatus for detecting a unique frequency signal obscured by a noise background is described. This apparatus comprises frequency analyzer means repetitively separating the combined signal and noise background into a spectrum of sinusoidal constituents, slope detection means coupled to the frequency analyzer means and producing signals representing the slope of the output signals produced by the analyzer, and switching means responsive to the slope detection means for initiating an output pulse each time the amplitude of output signal from the slope detection means reaches a predetermined level. Timing means coupled jointly to the switching means and the frequency analyzer means are provided for demarcating a time interval beginning upon initiation of each of the respective pulses, by terminating each pulse after a lapse of duration determined by amplitude of output signal from the frequency analyzer means at the instant the pulse was initiated.

BRIEF DESCRIPTION OF THE DRAWINGS

The features of the invention believed to be novel are set forth with particularity in the appended claims. The invention itself, however, both to organization and method of operation, together with further objects and advantages thereof, may best be understood by reference to the following description taken in conjunction with the accompanying drawings in which:

FIG. 1 is a block diagram of a first embodiment of the invention;

FIG. 2 is a waveform diagram to aid in explaining opration of the embodiment of FIG. 1;

FIG. 3 is a schematic diagram illustrating operation of the voltage-to-time converter of the embodiment of FIG. 1;

FIG. 4 is a combined block and schematic diagram of a second embodiment of the instant invention;

FIGS. 5A–5E are waveforms to aid in illustrating operation of the apparatus of FIG. 4;

FIG. 6 is block diagram of a third embodiment of the invention.

FIGS. 7A–7G are waveforms to aid in illustrating operation of the apparatus of FIG. 6; and FIG. 8 is a schematic diagram of a portion of the circuitry illustrated in block diagram form in FIG. 6.

DESCRIPTION OF THE PREFERRED EMBODIMENTS

In FIG. 1, a frequency analyzer 10 is shown coupling an input signal together with a large amount of random noise to a delay line 11. The frequency analyzer periodically scans the input signal and produces an output signal for each scan which is a function of the logarithm of the amplitude of the composite input signal versus the sinusoidal frequency constituents of the composite signal. A typical frequency analyzer which may be used for this purpose is shown and described in D. E. Wood Pat. No. 3,243,703, issued Mar. 29, 1966 and assigned to the instant assignee.

Delay line 11 is tapped near both its entry and exit ends, as well as at its midpoint. Output signals from the taps at the entry and exit ends are supplied to the inputs of a differential amplifier 12, the output of which actuates a flip-flop circuit 13. Output of flip-flop circuit 13 is supplied to a sampling monostable or one-shot multivibrator 14 which, in turn, provides a first input signal to a voltage-to-time converter 15. A second input signal to voltage-to-time converter 15 is provided from the midpoint of delay line 11 through an amplifier such as emitter follower amplifier 16. Output signals of voltage-to-time converter 15 drive a flip-flop circuit 17, which thereupon provides pulses through an output amplifier 18 to utilization apparatus (not shown).

In operation, frequency analyzer 10 repetitievly scans incoming signals received at its input and provides, at its output, a signal spectrum of the sinusoidal constituent frequencies of the input signal for each scan. The output signal of frequency spectrum analyzer 10 comprises logarithmic amplitude waveforms as a function of frequency, with each frequency spectrum scanned linearly from the low frequency end to the high frequency end. This enables use of a convenient wide amplitude range scale for pulse width indication of amplitude. The scanning repetition rate of frequency analyzer 10 may be adjusted to any desired rate which is sufficiently high to keep up adequately with the transient response of the frequency analyzer.

Differential amplifier 12 compares amplitude levels at two different instants in time on each output scan produced by analyzer 10, by virtue of the delay introduced by delay line 11. The overall delay of delay line 11 is preferably adjusted to provide a frequency sampling interval of duration approximately equal to the time required to scan one bandwidth of each spectrum produced by analyzer 10. Thus, an output signal is produced by differential amplifier 12 whenever the two points on the spectrum sensed by the differential amplifier are at different amplitude levels; when these points are at identical amplitude levels, differential amplifier 12 produces zero output voltage. Furthermore, whenever the two instants of sensing occur on the positive slope side of a peak or trough, output voltage produced by differential amplifier 12 is of one polarity; on the other hand, when the two instants of sensing occur on the negative slope side of a peak or trough, output voltage produced by differential amplifier 12 is of the opposite polarity. This condition is illustrated in FIG. 2 wherein a portion of the waveform produced by analyzer 10 is illustrated as a function of time. The segments of the waveform sensed by differential amplifier 12 are illustrated by intervals designated $T_a$, $T_b$ and $T_c$, wherein the positive slope of the waveform is sensed first, as indicated by interval $T_a$. As time progresses, the waveform is sensed in an interval when the two voltage levels on the waveform supplied to differential amplifier 12 are at equal amplitude, as indicated by interval $T_b$. At this time, the output of differential amplifier 12 is zero. Thereafter, the negative slope of the waveform is sensed, as indicated by interval $T_c$.

As long as an output voltage of predetermined polarity is produced by differential amplifier 12, flip-flop circuit 13 supplies an output voltage to sampling monostable multivibrator 14; however, whenever the output voltage of differential amplifier 12 falls to an amplitude of zero or entirely reverses polarity, output voltage of flip-flop circuit 13 drops to zero. When output voltage from differential amplifier 12, being of the aforementioned predetermined polarity, once again increases above the aforementioned amplitude near zero, flip-flop circuit 13 again supplies an output voltage to sampling monostable multivibrator 14. By requiring that output voltage of amplifier 12 be of but one predetermined polarity in order to trigger flip-flop 13, the circuit is rendered insensitive to troughs in the output spectrum of analyzer 10.

Each time the signal from flip-flop circuit 13 drops to zero, a negative output pulse, of fixed duration, is supplied by sampling monostable multivibrator 14 to voltage-to-time converter 15. Thus, the output pulse of monostable multivibrator 14 is initiated at the instant the voltage sensed by differential amplifier 12 is zero. Moreover, at this instant the input to emitter of follower amplifier 16 receives a voltage which, in most instances, represents the amplitude exactly at the peak occurring between the equal voltages on either side thereof which are being sensed by the differential amplifier. Hence, at the instant multivibrator 14 indicates that a peak is being sensed, amplifier 16 supplies a voltage to voltage-to-time converter 15 corresponding to the amplitude of this peak.

Voltage-to-time converter circuit 15 produces output pulses of uniform amplitude but varying width. Each of the output pulses produced by converter 15 has a minimum width corresponding to the width of the output pulse produced by multivibrator 14. Additional pulse width occurs in accordance with the amplitude of voltage supplied to converter 15 from amplifier 16, so that total width, if above the minimum, is directly proportional to the amplitude of output voltage produced by amplifier 16 and therefore varies as the logarithmic amplitude of the peak spectrum voltage being sensed. Hence, the output pulses produced by converter 15 correspond in width, or duration, to the logarithmic amplitude of the constituent frequency of the input signal sensed at the midpoint of delay line 11. A flip-flop circuit 17 shapes the waveforms of these pulses which are then supplied to utilization means through output amplifier 18 in clean, usable form.

FIG. 3 illustrates typical circuitry for the voltage-to-time converter of FIG. 1. Positive signals from the midpoint tap of delay line 11 of FIG. 1 are supplied through amplifier 16 and a diode 27 to one side of a capacitor 28, the other side of which is connected to the collector of an NPN transistor 29. Diode 27 prevents the voltage on capacitance 28 from affecting the biasing of amplifier 16. Negative signals are supplied to the base of transistor 29 from sampling monostable multivibrator 14 through a voltage divider network comprising resistances 30 and 31. A biasing resistance 32 is connected from the cathode of diode 27 to ground.

The collector of transistor 29 is connected through a diode 33 to one side of a filter capacitance 34, the other side of which is grounded. Diode 33 prevents voltage stored on capacitance 34 from charging capacitance 28. A leakage resistance 35 is connected in parallel with capacitance 34. Capacitance 34 is connected through a biasing resistance 36 to the emitter of an NPN transistor 37 shown dotted in the input circuitry of flip-flop 17. The base of transistor 37 is connected to the cathode of diode 27. Bias is supplied to transistor 37 through a collector load resistance 38 shown dotted, and output signals from the collector of transistor 37 are supplied to a subsequent stage of flip-flop circuit 17 from whence output signals are supplied to the input of output amplifier 18. Circuitry for only one stage of flip-flop 17 is illustrated in FIG. 3.

Output signals from delay line 11 are also supplied through a voltage dropping resistance 43, a variable resistance 40, and a fixed resistance 44 in series to the junction of capacitance 34 and the cathode of diode 33. Positive bias is supplied to the anode and the cathode of diode 33 through biasing resistances 41 and 42 respectively.

In operation, output waveforms from the midpoint of delay line 11 are supplied through amplifier 16 and diode 27 to capacitor 28 which, in the absence of a signal from multivibrator 14, is charged in series through transistor 29. When a pulse is produced by multivibrator 14, indicating presence of a peak at the midpoint of delay line 11, transistor 29 is rendered nonconductive. At this instant, bias current through resistance 41 is decreased, so that the voltage drop across resistance 41 also decreases sharply. Hence, the anode potential of diode 33 is sharply increased, driving the base of transistor 37 in flip-flop circuit 17 sharply positive through capacitance 28. Since, at this instant, output voltage from the midpoint of delay line 11 is at a peak, transistor 37 is rendered conductive and a positive output pulse is initiated by flip-flop circuit 17.

When transistor 37 thus begins conduction, capacitance 28 discharges through the base-emitter path of transistor 37, through resistance 36 in series with resistance 35, to ground, until the anode potentiail on diode 33 substantially reaches the cathode potential thereon. The cathode potential on diode 33 is determined by the voltage at the midpoint of the voltage divider network comprising resistances 35 and 42.

As the amplitude of ouput signal from the midpoint of delay line 11 begins to decrease, the amplitude of voltage on the base of transistor 37 decreases, causing transistor 37 to become nonconductive and thereby switch flip-flop circuit 17 to its reset condition. Thus, if the output pulse from the midpoint of delay line 11 is of sufficently large amplitude, transistor 37 will remain conductive for the entire duration of the output pulse from multivibrator 14. For smaller ampiltude output pulses from the midpoint of delay line 11, the conduction interval of transistor 37 is shortened. The minimum output pulse duration of flip-flop circuit 17 is established by the threshold bias adjustment provided by variable resistance 40 at the input of emitter follower amplifier 16. This adjustment effectively shifts the DC level at which capacitance 28 follows the output signal from amplifier 16.

Since the voltage amplitude supplied from the midpoint of delay line 11 is a logarithmic function of the amplitude of the constituent frequencies in the input signal supplied to the frequency analyzer, the length of output pulse from flip-flop circuit 17 is thereby made to be a logarithmic function of the amplitude of the constituent sinusoidal frequency being sensed. Hence, by detecting the input signal amid the noise supplied to frequency analyzer 10 in FIG. 1, output pulses supplied by flip-flop circuit 17 to amplifier 18 are similarly made to vary in accordance with amplitude of the detected input signal.

FIG. 4 is a second embodiment of the apparatus for detecting input signals amid noise. In this embodiment, frequency analyzer 10 again furnishes input signals to a delay line 50, from which input signals are supplied to the minuend input of a subtractor circuit 51. In addition, output signals from frequency analyzer 10 are also supplied to a first differentiator circuit 52 and thence to a second differentiator circuit 53 through an inverter circuit 56. The output signals of differentiator circuits 52 and 53 are supplied to the subtrahend input of subtractor circuit 51 through diodes 54 and 55 respectively. In addition, output signals from inverter 56 are furnished to the subtrahend input of subtractor circuit 51 through a diode 57. The anodes of diodes 54, 55 and 57 are commonly coupled to ground through a resistance 58.

Operation of the apparatus of FIG. 4 may be readily understood with the aid of the waveforms illustrated in FIGS. 5A–5E. Thus, FIG. 5A illustrates the output signal from frequency analyzer 10 for a period of time equal, for example, to the interval for a single spectrum scan. The output signal produced by differentiator circuit 52 is illustrated in FIG. 5B, while the output signal produced by differentiator circuit 53 is illustrated in FIG. 5C. It can be seen that the output of differentiator circuit 53 corresponds to the inverted second derivative of the output signal produced by frequency analyzer 10. The output signal of inverter 56, representing an inverted version of FIG. 5B, is illustrated in FIG. 5D. Only the negative portions of the output signals produced by differentiator circuits 52 and 53 and inverter circuit 56 are furnished to the input of subtractor circuit 51 because of diodes 54, 55 and 57, respectively. Thus, the negative portions of the output signals of differentiator circuit 52 and inverter circuit 56 are combined as illustrated in FIG. 5E.

Since the presence of delay line 50 is merely to compensate for the brief delays introduced by the circuitry in parallel therewith, the negative portions of the output voltages of differentiator circuits 52 and 53 and inverter circuit 56 are applied across resistance 58, and the largest negative voltage supplied thereto at any instant is subtracted in circuit 51 from the input signal produced by frequency analyzer 10. Hence, the output of subtractor circuit 51 comprises a slightly delayed version of the output of frequency spectrum analyzer 10, with all but the peak regions diminished. Effectively therefore, the peak regions of the spectrum are accentuated.

The apparatus of FIG. 6 is a third embodiment of the signal detector of the instant invention wherein, as with the embodiment of FIG. 1, a constant amplitude output pulse is initiated, during each frequency spectrum produced by frequency analyzer 10, coincidentally with each peak in the spectrum. These pulses, as the pulses of FIG. 1, are of duration proportional to the logarithmic amplitude of the input signal being detected, with a predetermined minimum duration. Thus, output signals of analyzer 10 are supplied through a delay line 60 to one input of a differential amplifier 61. In addition, output signals produced by analyzer 10 are differentiated in a differentiator 62 and supplied to one input of a second differential amplifier 64. A voltage from a bias supply 67 is furnished to a second input to differential amplifier 64. Output signals of differential amplifier 64 are differentiated by a differentiator 68. Each positive pulse produced by differentiator 68 triggers a sawtooth generator 65 into operation, thereby supplying a sawtooth waveform to a second input of differential amplifier 61. Output signals of differential amplifier 61 are furnished to utilization apparatus (not shown) through a power amplifier 66. Both differential amplifiers 61 and 64 include inverting as well as noninverting input circuits, with those inputs of amplifiers 61 and 64 which are responsive respectively to differentiator 62 and sawtooth generator 65 being of the inverting type.

In operation, delay line 60 functions to provide a delayed presentation of spectrum amplitude to the input of differential amplifier 61, so that the output pulse duration furnished by differential amplifier 61 accurately represents peak amplitude for peaks of intermediate amplitude. For extremely low and high amplitude peaks, this results, on the average, in a slight shortening of output pulse duration; however, by delaying the spectrum, any errors introduced thereby are drastically reduced.

The waveforms of FIG. 7 illustrate peak detection functions at key points in the circuit of FIG. 6 for a simple spectrum of two frequency components as illustrated in FIG. 7A. Because the amplitude of output signals produced by analyzer 10 is a logarithmic function of the input signal, the slope signals produced by differentiator circuit 62 are not the time derivatives of direct spectrum amplitude; however, by using a logarithmic amplitude output signal from analyzer 10, a convenient wide amplitude range scale is obtained for pulse width indication of amplitude. Moreover, consistently good definition at all amplitudes of peaks requires that the slope of the logarithm of spectrum amplitude be utilized, rather than the slope of direct spectrum amplitude. The slope of the logarithm of the spectrum amplitude is obtained by differentiating the frequency analyzer output signals in differentiator 62, and the amplitude of the slope function so derived is compared to a bias voltage from bias supply 67 in differential amplifier 64. FIG. 7B represents the spectrum of FIG. 7A as furnished to amplifier 61 after the delay introduced by delay line 60. The output signal of differentiator 62 is represented by the solid line waveform of FIG. 7C, while the bias level produced by bias supply 67 is indicated by the dotted line.

Whenever the positive amplitude of output voltage from differentiator 62 exceeds the bias level from bias supply 67, differential amplifier 64 initiates a negative-going output pulse, as illustrated in FIG. 7D. When the amplitude of input signal from differentiator 62 next returns to zero, the output pulse of differential amplifier 64 is terminated. When the next positive excursion of output signal from differentiator 62 exceeds the bias level, a new output pulse is initiated by differential amplifier 64. Thus, differential amplifier 64 is responsive only to positive slope of the output signal from frequency spectrum analyzer 10, thereby preventing minima in the spectrum from being treated as peaks which are maxima.

The rectangular pulses produced by differential amplifier 64 are differentiated by differentiator 68 so as to produce a negative spike upon initiation of each rectangular pulse and a positive spike upon termination of each such pulse. These spikes are illustrated in FIG. 7E. Sawtooth generator 65 is responsive only to positive signals; hence, each positive spike initiates a sawtooth wave from sawtooth generator 65, as illustrated in FIG. 7F, which is used to trigger differential amplifier 61. Due to the high gain of amplifier 61, output voltage of the amplifier abruptly increases to its saturated value, where it remains. When the amplitude of the negative sawtooth wave generated by sawtooth generator 65 reaches a level equal to the absolute amplitude of the frequency spectrum furnished to differential amplifier 61 through delay line 60, differential amplifier 61 is abruptly reset to its original value. Differential amplifier 61 includes an adjustment for establishing a minimum pulse length which, preferably, is set to produce the narrowest pulse that can be readily discerned. Thus, the output signal of differential amplifier 61, which is illustrated by the solid line waveforms in FIG. 7G, comprises a constant amplitude pulse of duration proportional to the logarithm of the spectrum amplitude at the instant of occurrence of a peak, but with a minimum duration, as indicated by the dotted line waveforms in FIG. 7G, which is independent of the peak amplitude. Maximum pulse length, which is determined by sawtooth generator 65, is set to be just less than the expected minimum time between occurrence of a peak and the next positive slope in a spectrum.

FIG. 8 illustrates circuit details for differential amplifier 64 of FIG. 6, shown connected to its associated peripheral circuits. Output of differentiator 62 is furnished through a coupling resistance 70 to the (−) or inverting input of differential amplifier 64. A positive bias voltage is supplied from DC power supply 67 through a pair of voltage dividing resistances 72 and 73 and a current limiting resistance 74 to the (+) or noninverting input of amplifier 64. Resistance 73 is preferably variable so as to allow adjustment of the bias level at which an output pulse is initiated from amplifier 64. A diode 75 is connected between the (+) input to amplifier 64 and the output thereof, with the cathode connected to the output and the anode connected to the input. Output signals of amplifier 64 are supplied to the input of differentiator 68.

Amplifier 64 functions as a hysteresis flip-flop, since feedback supplied by diode 75 holds the (+) input to amplifier 64 at ground potential whenever the output signal of amplifier 64 goes to zero or becomes negative. Thus, when the amplitude of positive output voltage from differentiator 62 rises above the level of bias voltage supplied to the (+) input of amplifier 64, the amplifier output voltage drops to a low value, such as zero. This voltage change is abrupt, due to the high gain of the amplifier. Once the output voltage of amplifier 64 drops to zero, diode 75 becomes forward-biased and is rendered conductive. The resulting voltage drop across resistance 74, due to current from bias supply 67, lowers to ground the potential supplied to the (+) input of amplifier 64, so that amplifier 64 remains conductive until the potential supplied to the (−) input of amplifier 64 becomes zero. When this occurs, output voltage from amplifier 64 again becomes positive, so that diode 75 is no longer forward-biased; hence, a positive bias voltage is once again supplied to the (+) input of amplifier 64 due to cessation of current through resistance 74. Because of the high gain of amplifier 64, the output voltage of amplifier 64 is abruptly reset to a positive value when the output signal from differentiator 62 becomes zero, so that the output pulse produced by amplifier 64 is substantially rectangular in shape. For this reason, amplifier 64 and its associated circuitry may be referred to as a hysteresis flip-flop. It will be recognized that as long as the polarity of output voltage produced by differentiator circuit 62 is negative, amplifier 64 continues to produce a steady positive output voltage since the high gain of the amplifier results in saturation during this time. Moreover, for as long as a positive voltage at the (+) input to amplifier 64 remains below the amplitude of the positive voltage at the (−) input of amplifier 64, the amplifier remains in saturation and the positive output voltage accordingly remains constant.

The foregoing describes a method and apparatus for detecting, with a high degree of sensitivity, a small signal obscured by large amounts of random noise. The method and apparatus of the instant invention permit reliable detection of desired signal peaks from amid a background of random noise. Moreover, the invention also provides a plurality of constant amplitude pulses whose frequency and duration correspond to the frequency and peak amplitudes of a signal to be detected from amid a background of random noise.

I claim:

1. A method of detecting a unique frequency signal obscured by a noise background comprising the steps of repetitively separating the composite of the noise plus unique frequency signal into sinusoidal frequency spectra, sensing peaks in each spectrum of the composite of the signal to be sensed and the noise background, generating a constant amplitude pulse at the instant each peak is detected, and terminating said pulse at a time dependent upon the amplitude of said peak.

2. The method of detecting a unique frequency signal obscured by the noise background of claim 1 wherein said step of sensing peaks in each spectrum of the composite of the signal to be sensed and the noise background comprises sensing positive slopes in said spectrum by electrically comparing a time delayed portion of said spectrum with a non-delayed portion of the spectrum, and sensing each zero slope in said spectrum which occurs immediately following a sensed positive slope by detecting an equality in the amplitudes of the delayed and non-delayed portions of the spectrum.

3. The method of detecting a unique frequency signal obscured by a noise background of claim 1 wherein the step of sensing peaks in each spectrum of the composite of the signal to be sensed and the noise background comprises sensing positive slopes above a predetermined value in said spectrum by electrically comparing the differential of the spectrum to said predetermined value, and sensing each zero slope in said spectrum which occurs immediately following a sensed positive slope by detecting the passage of the spectrum differential through zero.

4. A method of detecting a unique frequency signal obscured by a noise background comprising the steps of repetitively separating the composite of the noise plus unique frequency signal into sinusoidal frequency spectra, sensing peaks in each spectrum of the composite of the signal to be sensed and the noise background, and continuously subtracting from said spectrum the largest in instantaneous amplitude of a group of signals corresponding to the absolute value of the first time derivative of said spectrum and the value of the second time derivative which is of polarity opposite to that of said spectrum.

5. Apparatus for detecting a unique frequency signal obscured by a noise background comprising: frequency analyzer means repetitively separating the composite of the noise plus unique frequency signal into sinusoidal frequency spectra; slope detection means coupled to said frequency analyzer means and producing signals representing the slope of the output signals produced by said analyzer; switching means responsive to the slope detection means for switching to a pulse initiation mode so as to initiate an output pulse each time the amplitude of output signal from the slope detection means reaches a first predetermined level from a predetermined polarity of signal; and timing means responsive to the switching means for demarcating a time interval beginning upon initiation of each respective output pulse by terminating said each output pulse after a lapse of duration determined by amplitude of output signal from the frequency analyzer means.

6. The apparatus of claim 5 wherein said slope detection means comprises differential amplifier means and delay means coupling said frequency analyzer means to said differential amplifier means, said delay means furnishing a difference in voltage level between two taps on said delay means, the coincidental voltage at said taps representing voltage amplitudes occurring at different times in each of said frequency spectra.

7. Apparatus for detecting a unique frequency signal obscured by a noise background comprising: frequency analyzer means repetitively separating the composite of the noise plus unique frequency signal into sinusoidal frequency spectra; first differentiator means responsive to said frequency analyzer for producing the time derivative of each of said spectra; second differentiator means; inverter means coupling the output of said first differentiator means to the input of said second differentiator means whereby said second differentiator means produces the time derivative of output signals from said inverter means; subtractor means; delay means coupling the output of said frequency analyzer means to one input of said subtractor means; and rectifier means coupling the respective outputs of said first and second differentiator means and said inverter means to a second input of said subtractor means, whereby said subtractor means produces an output signal corresponding to subtraction of the largest halfwave rectified signal at any instant, produced by said first and second differentiator means and said inverter means, from the output signal of said delay means.

8. Apparatus for detecting a unique frequency obscured by noise according to claim 5 wherein said switching means comprises differential amplifier means having both an inverting and a non-inverting input; resistance means coupling a bias voltage to one of said inputs; diode means coupling said one of said inputs to the output of said differential amplifier means; and means coupling said slope detection means to the other said inputs of said differential amplifier means.

References Cited

UNITED STATES PATENTS

| | | | |
|---|---|---|---|
| 2,161,764 | 6/1939 | Minton | 324—77 |
| 2,490,530 | 12/1949 | Loughlin | 324—77 |
| 2,523,283 | 9/1950 | Dickson | 328—165 |
| 2,958,043 | 10/1960 | Harding | 328—165 |
| 3,095,541 | 6/1963 | Ashcraft | 324—77 |
| 3,334,298 | 8/1967 | Monrad-Krohn | 324—77 |
| 3,369,182 | 2/1968 | Reindl | 328—151 |
| 3,398,373 | 8/1968 | Caswell | 328—150 |

DONALD D. FORRER, Primary Examiner

H. A. DIXON, Assistant Examiner

U.S. Cl. X.R.

307—261, 265; 328—151